T. J. SHEEHAN.
REFRIGERATING APPARATUS.
APPLICATION FILED JULY 28, 1917.

1,289,560.

Patented Dec. 31, 1918.
4 SHEETS—SHEET 1.

INVENTOR:
Thomas J. Sheehan,
BY
Hugh N. Wagner,
ATTORNEY.

T. J. SHEEHAN.
REFRIGERATING APPARATUS.
APPLICATION FILED JULY 28, 1917.

1,289,560.

Patented Dec. 31, 1918.
4 SHEETS—SHEET 2.

INVENTOR:
Thomas J. Sheehan,
BY
Hugh K. Wagner,
ATTORNEY.

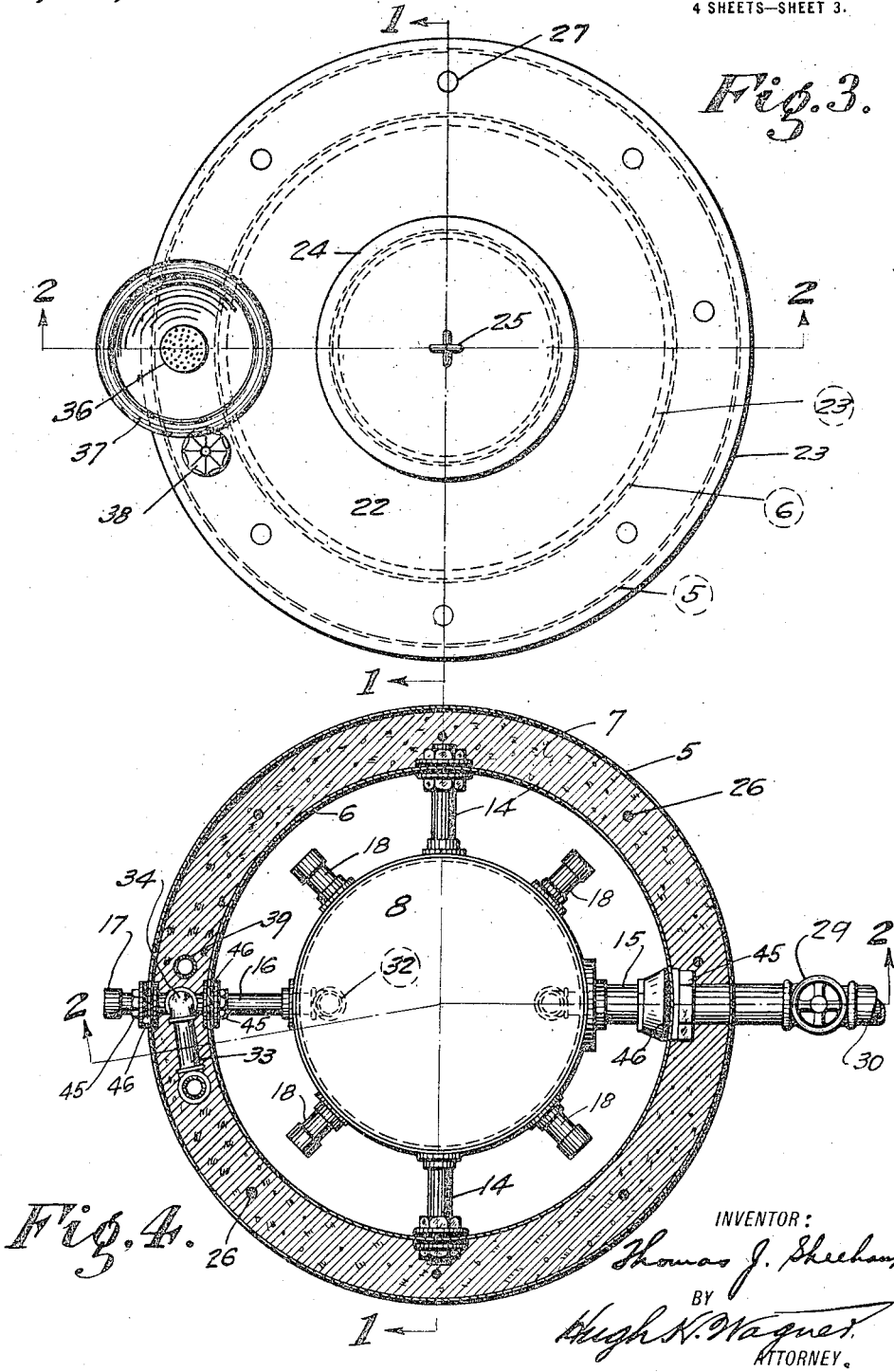

T. J. SHEEHAN.
REFRIGERATING APPARATUS.
APPLICATION FILED JULY 28, 1917.

1,289,560.

Patented Dec. 31, 1918.
4 SHEETS—SHEET 4.

INVENTOR:
Thomas J. Sheehan,
BY
Hugh K. Wagner
ATTORNEY.

UNITED STATES PATENT OFFICE.

THOMAS J. SHEEHAN, OF ST. LOUIS, MISSOURI.

REFRIGERATING APPARATUS.

1,289,560.  Specification of Letters Patent.  Patented Dec. 31, 1918.

Application filed July 28, 1917. Serial No. 183,209.

*To all whom it may concern:*

Be it known that I, THOMAS J. SHEEHAN, a citizen of the United States, residing at the city of St. Louis, in the State of Missouri, have invented certain new and useful Improvements in Refrigerating Apparatus, of which the following is a specification.

Water at atmospheric temperature or at a temperature of water in water mains is in warm weather not satisfying to quench the thirst, while ice water (by which is meant water derived from the melting of ice or water that has come into immediate contact with ice) is detrimental to the health, because of being too intensely cold or on account of impurities in the ice. The object of this invention is to supply water that is indirectly cooled or refrigerated and, more particularly, to provide apparatus for this purpose that is suitable for installation in factories, for street fountains, and in other locations where considerable quantities of refrigerated water will be consumed.

In the accompanying drawings forming part of this specification and in which like numbers of reference denote like parts wherever they occur, Figure 1 is a sectional view on the line 1—1 in Figs. 3, 4, and 5, showing the interior in elevation with blocks of ice for refrigerating purposes, with part of the interior tank broken away;

Fig. 3 is a top plan view;

Fig. 4 is a transverse sectional view on the line 4—4 in Figs. 1 and 2;

Figure 1:
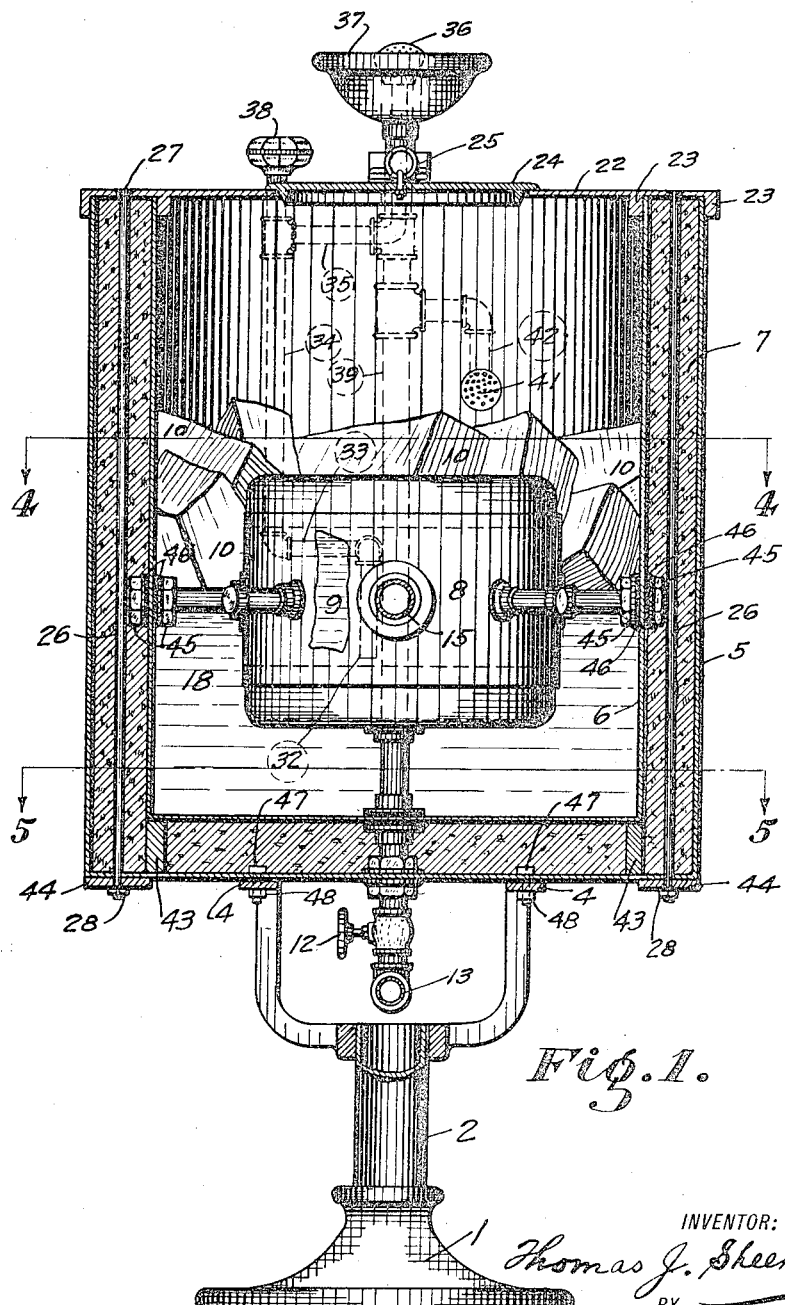

A base 1, having an upright standard 2, carrying a U-frame 3, provided with seats 4, supports a tank 5 made of sheet metal or other suitable material.

Within the said tank 5, is a smaller tank 6, substantially concentric therewith, the space between the bottoms of the said tanks and between the side walls thereof being provided with insulating material 7, such, for instance, as ground cork.

Another tank 8, within tank 6, will be termed the cooling or storage tank, and normally contains water 9 that has been chilled by ice-blocks 10 or ammonia-pipes (not shown in the drawings) or other refrigerating means. The ice may be in the form of a large cake that lies upon the top of tank 8.

The tank 8 is supported from the bottom by pipe 11, which is adapted for draining and cleansing tank 8, as the same is controlled by cock 12 and leads to drain-pipe 13.

Tank 8 is, furthermore, braced as most clearly shown in Fig. 4 by plugged arm-supports 14 and water-service pipe 15 and by pipe 16, having the cap 17.

The outer ends of studs 18 are spaced from the inner wall of the inner tank in order that the tank may be more readily and thoroughly cleaned when desired.

Water accumulates from melting of the ice in the container formed of tanks 5 and 6 and intermediate insulation 7, and on opening cock 19 can be allowed to run off into drain-pipe 13. A strainer 20 may, if desired, be placed over the mouth of pipe 21 that leads to drain-pipe 13.

The container is closed at the top by lid 22, which has at its edge a groove formed by the parallel flanges 23. An opening in the said lid 22 is normally closed by the trap-door 24, provided with the ring 25 or a knob for easy handling. The lid 22 is bound to the said container by rods 26, having heads 27, by nuts 28, which rods 26 run through the insulation 7. While the container is in the drawings shown as round in cross-section, its shape may be varied as desired. The said trap-door 24 is provided for access to the interior of the container, for the purpose, for instance, of putting blocks of ice 10 therein or for any other needful purpose.

The cock 29 being open, and water being admitted from the municipal or other main 30 through pipe 15 into the interior of tank 8, it flows out through nipple 31 at a point near the top of tank 8, the same being relatively warm on entrance and gradually sinking to the bottom of the tank 8 as it becomes chilled, cold water being heavier than warmer water. The water that flows out of tank 8 is taken by nipple 32 at a point near the bottom of tank 8, and is, consequently, the coldest in the tank.

Figure 2:
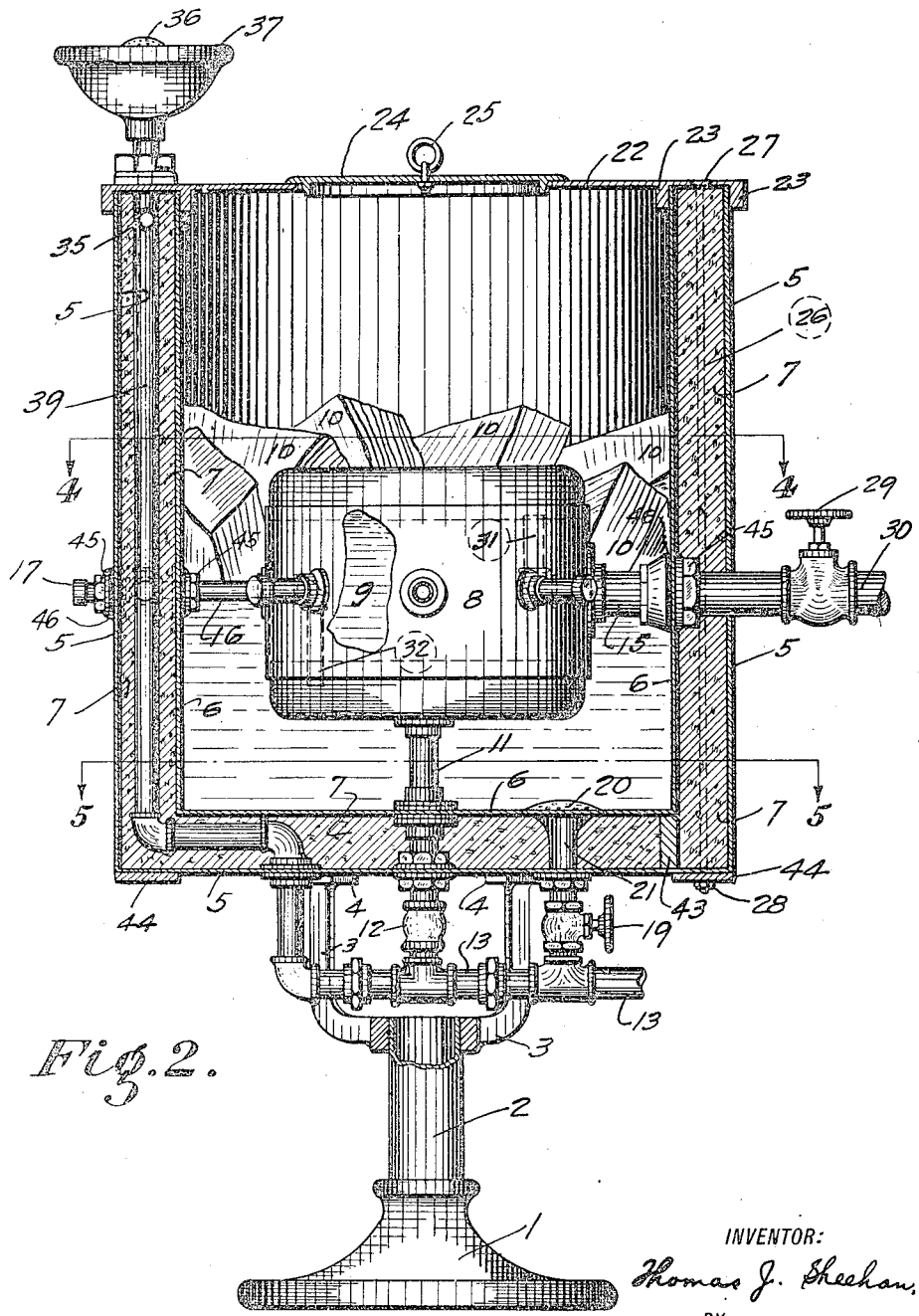
Fig. 2 is a sectional view on the line 2—2 in Figs. 3, 4, and 5, and taken at a right angle to the sectional line of Fig. 1 and showing the interior in elevation, with part of the interior tank broken away.
Figure 5:
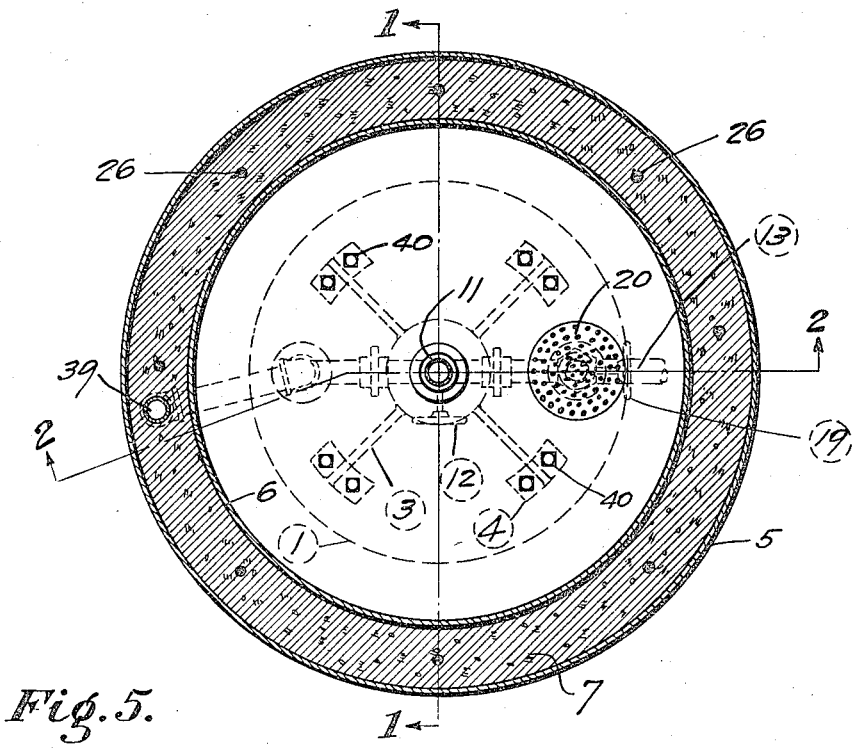
Fig. 5 is a transverse sectional view on the line 5—5 in Figs. 1 and 2.
Figure 6:
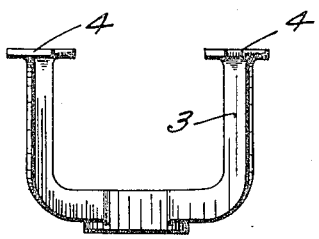
Fig. 6 is a detail in elevation of the frame-support for the tank.

Nipple 32 connects with pipe 16, and the latter with pipe 33, which leads to pipe 34 and the latter by means of a branch 35 to a mouth fountain 36 within a basin 37. The water in the main 30 and tank 8 being under pressure, rotation of the self-closing cock 38 allows cooled water from tank 8 to rise through pipes 16, 33, 34, and 35 to fountain 36, where it overflows into basin 37, out of which it drains through pipe 39 to drain 13, as clearly shown in Fig. 2.

When water rises high enough in the container, it will drain through strainer 41 on branch-pipe 42 and through pipe 39, strainer 41 being in the wall of inner tank 6 and branch pipe 42, as well as pipe 39, being in the space between tanks 5 and 6.

Pipes 34, 35, 39 and 42 are placed between the walls of the outer and inner tanks in order that the inner tank may be more readily and thoroughly cleansed when desired.

Feet 43 support tank 6 from the bottom of tank 5, in addition to such support as it receives from the insulation 7 and connections of pipe 11.

The reinforcing ring or strip 44 is interposed between the bottom of tank 5 and the nuts 28, there being a plurality of binding-rods 26, heads 27, and nuts 28.

Locknuts 45 and gaskets 46 are used at various suitable places throughout the structure.

Bolts 47 and nuts 48 secure tank 5 and thereby the three concentric tanks 5, 6, and 7 to the rests 4, thus firmly fixing the whole structure to and upon the base 1.

Having thus described this invention, I hereby reserve the benefit of all changes in form, arrangement, order, or use of parts, as it is evident that many minor changes may be made therein without departing from the spirit of this invention.

I claim:

In a cooler of the class described, the combination of inner and outer casings, insulation between the two casings, a water receptacle within the inner casing, means for supporting the receptacle to expose all sides thereof to the action of ice contained in the inner casing, a service pipe extending through the casings and into the receptacle, the inner end of the service pipe being extended vertically to a point near the top of the receptacle, a draw off pipe embedded in the insulation and provided at its lower end with an extension which projects through the inner casing and into the receptacle, the inner end of said draw off pipe being vertically disposed and terminating at a point near the bottom of said receptacle, the upper end of the draw off pipe terminating above the casings, a basin surrounding the exposed end of the draw off pipe, a drain pipe connected to the basin, a controlling valve in the draw off pipe, and projections extending from the sides of the water receptacle, which with the service and draw off pipes form a rack to support ice around the upper portion of said receptacle.

In testimony whereof I hereunto affix my signature.

THOMAS J. SHEEHAN.

Copies of this patent may be obtained for five cents each, by addressing the "Commissioner of Patents, Washington, D. C."